United States Patent
Shinoda et al.

(10) Patent No.: US 12,404,895 B2
(45) Date of Patent: Sep. 2, 2025

(54) FOIL BEARING

(71) Applicant: KABUSHIKI KAISHA TOYOTA JIDOSHOKKI, Kariya (JP)

(72) Inventors: Fumiya Shinoda, Kariya (JP); Fumihiro Suzuki, Kariya (JP); Takahito Kunieda, Kariya (JP); Kenta Nakane, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 126 days.

(21) Appl. No.: 18/472,465

(22) Filed: Sep. 22, 2023

(65) Prior Publication Data

US 2024/0125349 A1   Apr. 18, 2024

(30) Foreign Application Priority Data

Oct. 13, 2022 (JP) .................................. 2022-164877
May 19, 2023 (JP) .................................. 2023-082789

(51) Int. Cl.
*F16C 17/02* (2006.01)

(52) U.S. Cl.
CPC .................................. *F16C 17/024* (2013.01)

(58) Field of Classification Search
CPC .................................................... F16C 17/024
See application file for complete search history.

(56) References Cited

U.S. PATENT DOCUMENTS

| 11,560,922 B2 * | 1/2023 | Aguilar | F16C 17/024 |
| 11,739,761 B2 * | 8/2023 | Okano | F16C 17/024 |
| | | | 415/103 |
| 2022/0099102 A1 | 3/2022 | Okano et al. | |

FOREIGN PATENT DOCUMENTS

JP    2022-057207 A    4/2022

* cited by examiner

*Primary Examiner* — James Pilkington
(74) *Attorney, Agent, or Firm* — Sughrue Mion, PLLC

(57) ABSTRACT

A foil bearing includes a bearing housing, a top foil, a bump foil, and two retaining portions. A holding groove is formed in the inner circumferential surface of the bearing housing to extend in an axial direction. The top foil and the bump foil each include an insertion plate portion, which is inserted into the holding groove and extends in the axial direction. Each of the retaining portions includes a facing surface that faces the insertion plate portion in the axial direction. In the axial direction, the distance between the facing surfaces of the two retaining portions is longer than the length of the insertion plate portion. At least one of the insertion plate portions includes a bent plate portion that is bent to contact the facing surface.

9 Claims, 8 Drawing Sheets

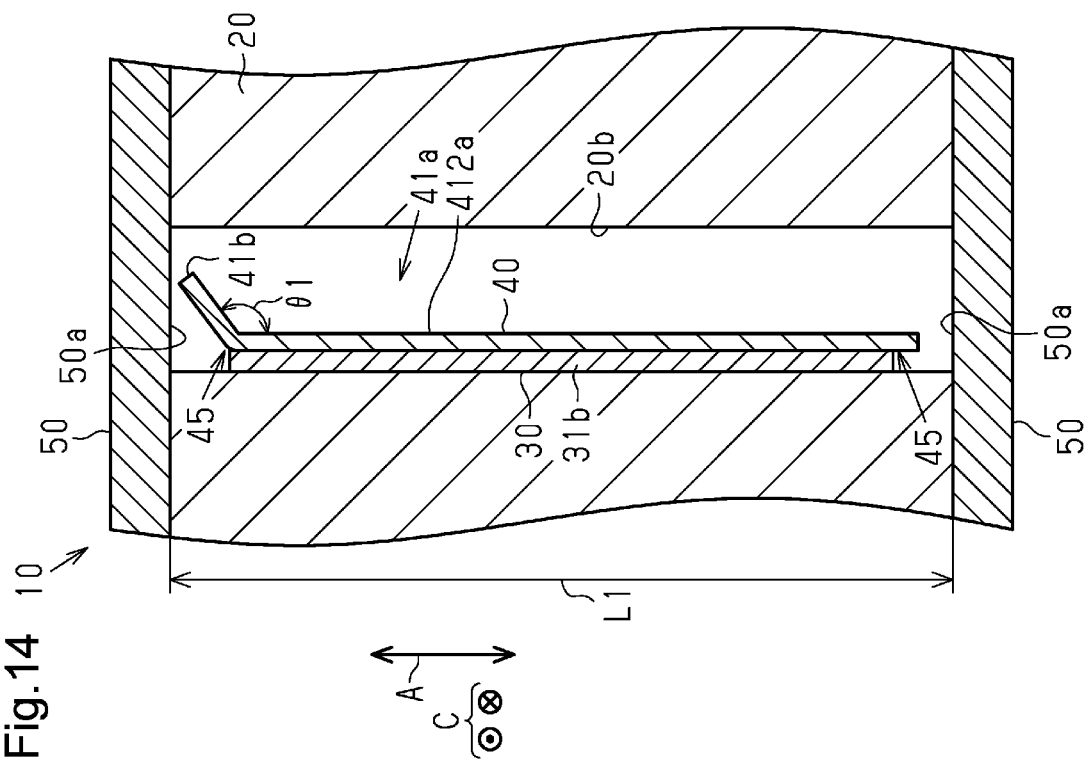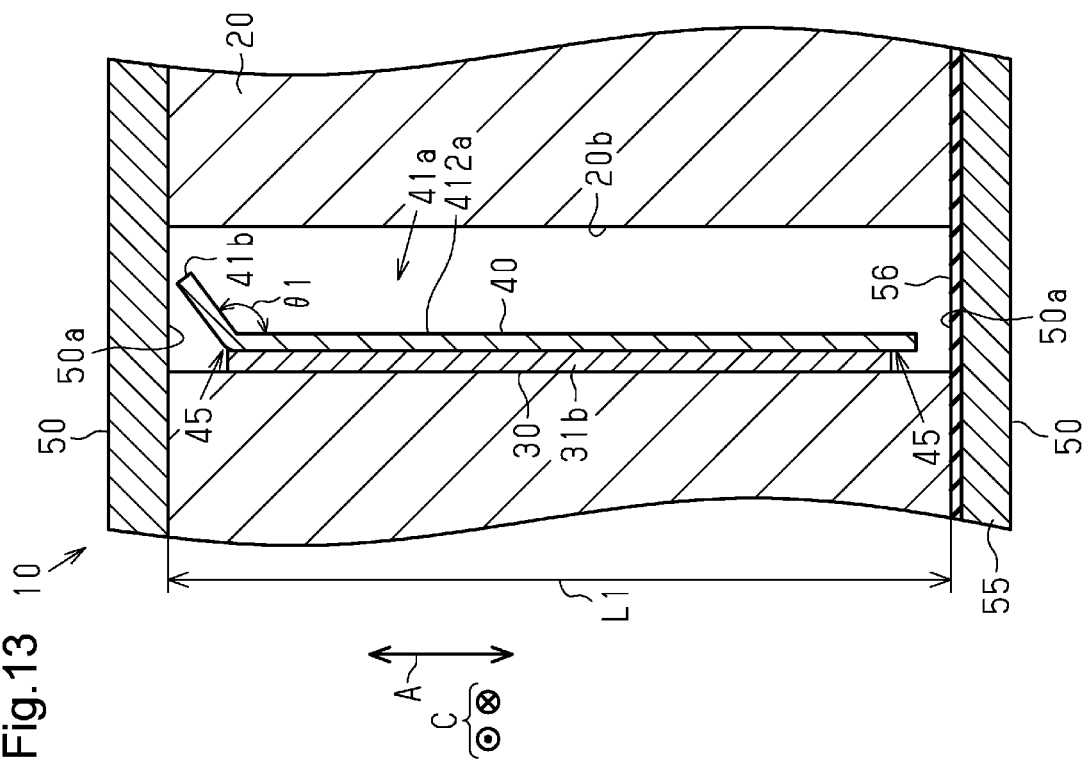

FOIL BEARING

BACKGROUND

1. Field

The present disclosure relates to a foil bearing that supports a rotary shaft in a radial direction.

2. Description of Related Art

Japanese Laid-Open Patent Publication No. 2022-57207 discloses a centrifugal compressor equipped with a foil bearing that supports a rotary shaft in a radial direction.

This foil bearing includes a tubular bearing housing, a top foil, a bump foil, and a retaining portion. A rotary shaft is inserted into the bearing housing. The top foil is disposed between the rotary shaft and the bearing housing. The bump foil is disposed between the bearing housing and the top foil. The bump foil elastically supports the top foil. A holding groove is formed in the inner circumferential surface of the bearing housing. The holding groove opens at one end in the axial direction of the bearing housing. A part of the top foil and a part of the bump foil are inserted into the holding groove. The retaining portion faces the top foil and the bump foil in the axial direction of the bearing housing. Even if the top foil and the bump foil move in the axial direction of the bearing housing, the top foil and the bump foil contact the retaining portion. The retaining portion prevents the top foil and the bump foil from being dislodged from the bearing housing.

When at least one of the top foil or the bump foil contacts the retaining portion, at least one of the top foil or the bump foil may be pressed against the retaining portion more than necessary. This may cause the retaining portion and at least one of the top foil or the bump foil to wear.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a foil bearing supports a rotary shaft in a radial direction. The foil bearing includes a tubular bearing housing into which the rotary shaft is inserted, a thin plate-shaped top foil disposed between the rotary shaft and the bearing housing, a thin plate-shaped bump foil that is disposed between the bearing housing and the top foil to elastically support the top foil, and two retaining portions facing the top foil and the bump foil in an axial direction of the bearing housing and preventing the top foil and the bump foil from being dislodged from the bearing housing. A holding groove is formed in an inner circumferential surface of the bearing housing to extend in the axial direction. The top foil and the bump foil each include an insertion plate portion, which is inserted into the holding groove and extends in the axial direction. Each of the retaining portions includes a facing surface that faces the insertion plate portion in the axial direction. In the axial direction, a distance between the facing surfaces of the two retaining portions is longer than a length of the insertion plate portion. At least one of the insertion plate portion of the top foil and the insertion plate portion of the bump foil includes a bent plate portion at at least one of opposite ends in the axial direction. The bent plate portion is bent to contact the corresponding facing surface.

Other features and aspects will be apparent from the following detailed description, the drawings, and the claims.

BRIEF DESCRIPTION OF THE DRAWINGS

FIG. 13 is a cross-sectional view of a foil bearing according to a modification.

FIG. 14 is a cross-sectional view of a foil bearing according to a modification.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Foil bearings 10 according to a first embodiment will now be described with reference to FIGS. 1 to 6. The foil bearings 10 of the present embodiment are mounted on a centrifugal compressor 100.

Centrifugal Compressor

Figure 1:
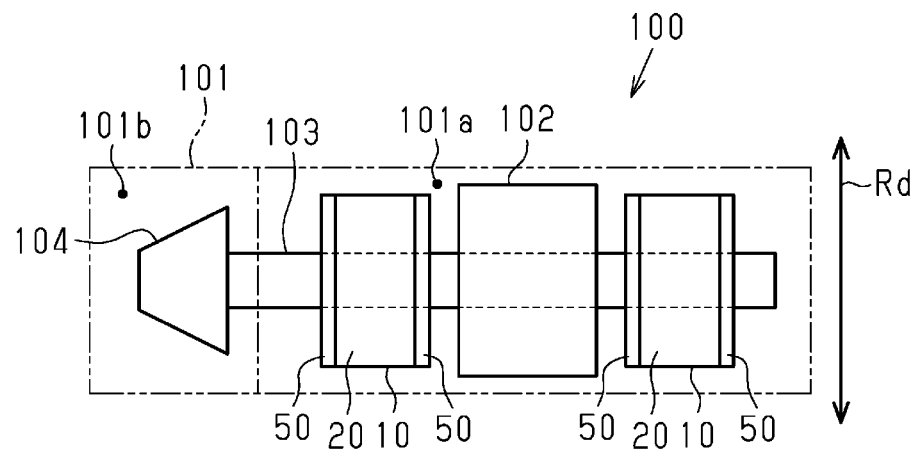
FIG. 1 is a schematic diagram showing a centrifugal compressor equipped with a foil bearing according to a first embodiment.

As shown in FIG. 1, the centrifugal compressor 100 includes two foil bearings 10, a housing 101, an electric motor 102, a rotary shaft 103, and an impeller 104. The electric motor 102, the rotary shaft 103, and the impeller 104 are accommodated in the housing 101. The electric motor 102 is accommodated in a motor chamber 101a formed in the housing 101. The impeller 104 is accommodated in an impeller chamber 101b formed in the housing 101. The rotary shaft 103 extends from the motor chamber 101a to the impeller chamber 101b. The electric motor 102 is attached to the rotary shaft 103. The impeller 104 is attached to an end of the rotary shaft 103. When the electric motor 102 operates, the rotary shaft 103 rotates. When the rotary shaft 103 rotates, the impeller 104 rotates. When the impeller 104 rotates, fluid is drawn into the impeller chamber 101b from the outside of the housing 101 and is then compressed in the impeller chamber 101b. The fluid compressed in the impeller chamber 101b is discharged to the outside of the housing 101.

The two foil bearings 10 support the rotary shaft 103 in a radial direction Rd. The two foil bearings 10 are located at the opposite sides of the electric motor 102 in the axial direction of the rotary shaft 103. The two foil bearings 10 are fixed to the housing 101.

Foil Bearing

Figure 2:
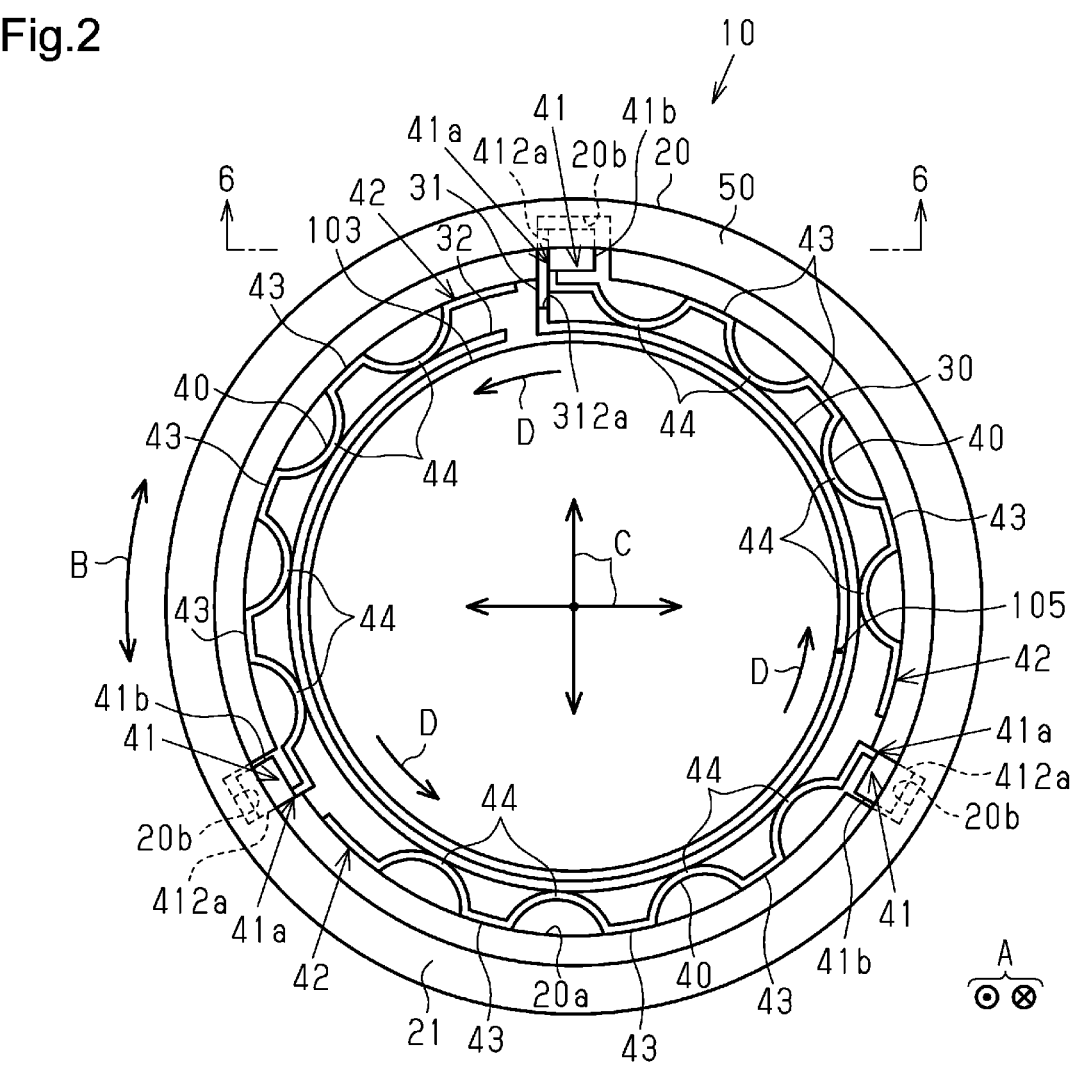
FIG. 2 is a front view of the foil bearing shown in FIG. 1.
Figure 3:
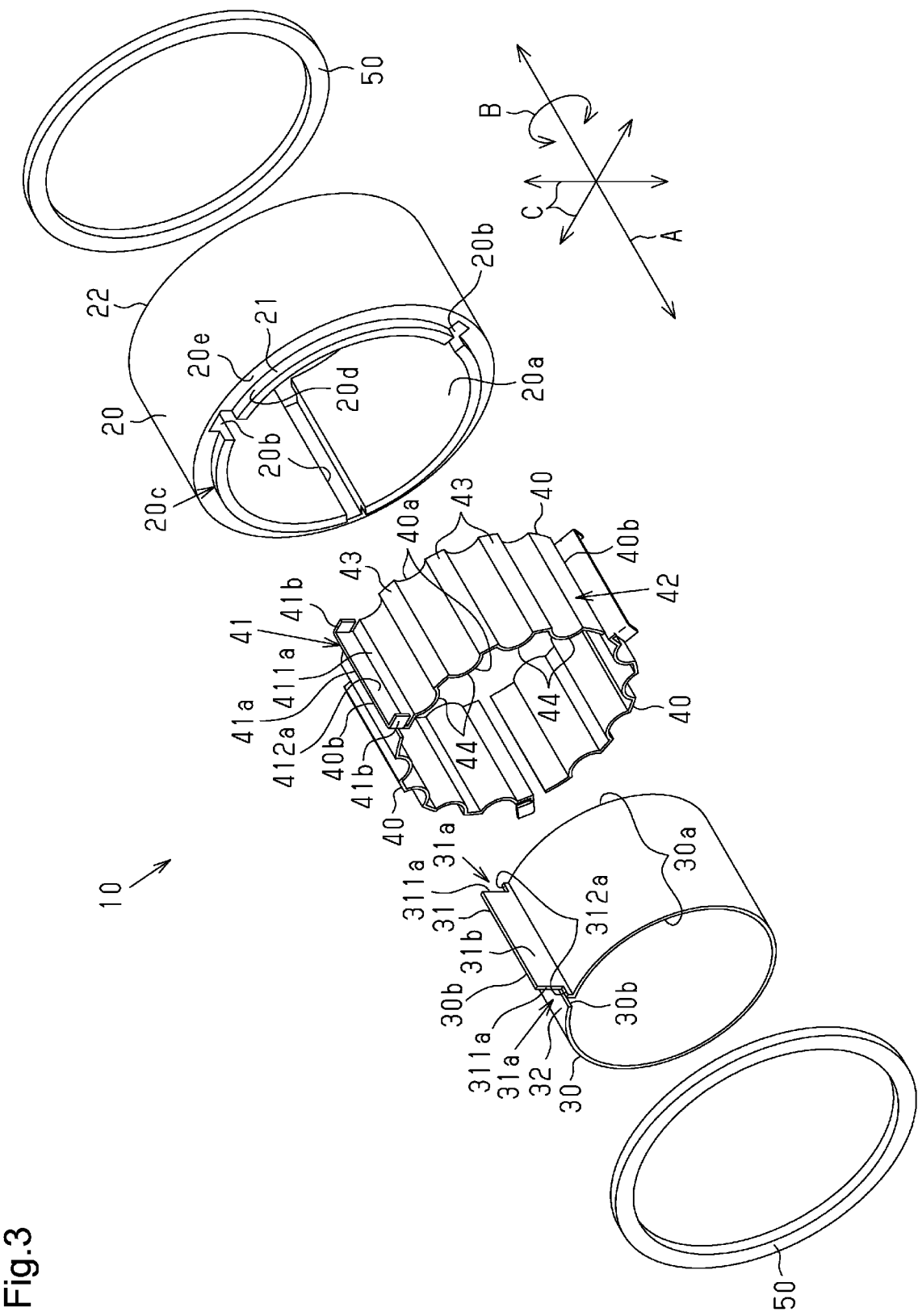
FIG. 3 is an exploded perspective view of the foil bearing shown in FIG. 2.

As shown in FIGS. 2 and 3, the foil bearing 10 includes a tubular bearing housing 20, a thin plate-shaped top foil 30, three thin plate-shaped bump foils 40, and two retaining members 50. The bearing housing 20 is made of, for example, aluminum.

Bearing Housing

As shown in FIG. 2, the rotary shaft 103 is inserted into the bearing housing 20. In the following description, the axial direction of the bearing housing 20 will simply be referred to as an axial direction A, a circumferential direction of the bearing housing 20 will simply be referred to as a circumferential direction B, and a radial direction of the bearing housing 20 will simply be referred to as a radial direction C. The bearing housing 20 includes an inner circumferential surface 20a. The inner circumferential surface 20a is a cylindrical surface that is curved in the circumferential direction B.

As shown in FIG. 3, the bearing housing 20 includes a first end portion 21 and a second end portion 22. The first end portion 21 and the second end portion 22 are end portions of the bearing housing 20 in the axial direction A. The first end portion 21 is one end portion of the bearing housing 20 in the axial direction A. The second end portion 22 is another end portion of the bearing housing 20 in the axial direction A. Holding grooves 20b are formed in the inner circumferential surface 20a of the bearing housing 20. The number of the holding grooves 20b in the inner circumferential surface 20a is three. The three holding grooves 20b are disposed at specified intervals in the circumferential direction of the B. The holding grooves 20b extend in the axial direction A. Each holding groove 20b extends over the entire length of the inner circumferential surface 20a in the axial direction A.

The first end portion 21 and the second end portion 22 each include an annular cutout groove 20c. The cutout grooves 20c open outward in the radial direction C. The cutout groove 20c of the first end portion 21 is open toward the side opposite to the second end portion 22 in the axial direction A. The cutout groove 20c of the second end portion 22 is open toward the side opposite to the first end portion 21 in the axial direction A. Each cutout groove 20c includes a cylindrical surface 20d, which extends in the axial direction A, and an annular surface 20e, which extends in the radial direction C. The holding grooves 20b open in the cylindrical surface 20d and the annular surface 20e. FIG. 2 does not show the cutout groove 20c formed in the second end portion 22.

Top Foil

As shown in FIG. 2, the top foil 30 is disposed inward of the bearing housing 20. The top foil 30 is disposed between the rotary shaft 103 and the bearing housing 20.

As shown in FIG. 3, the top foil 30 is formed by bending a flexible elongated metal plate into a tubular shape. The top foil 30 includes two long edges 30a and two short edges 30b. One of the two long edges 30a may be referred to as a first long edge 30a, and the other may be referred to as a second long edge 30a. One of the two short edges 30b may be referred to as a first short edge 30b, and the other may be referred to as a second short edge 30b. The top foil 30 is substantially cylindrical. The axial direction of the top foil 30 agrees with the axial direction A of the bearing housing 20. The circumferential direction of the top foil 30 agrees with the circumferential direction B of the bearing housing 20. The radial direction of the top foil 30 agrees with the radial direction C of the bearing housing 20. The top foil 30 is formed by being bent into a tubular shape such that the two long edges 30a extend in the circumferential direction B, and the two short edges 30b extend in the axial direction A. The length between the long edges 30a is equal to the length in the axial direction A of the bearing housing 20. The metal plate forming the top foil 30 is made of, for example, stainless steel or an Inconel® type nickel alloy.

The top foil 30 includes a fixed end 31 and a free end 32. The fixed end 31 is formed by bending one end in the long-side direction of the metal plate forming the top foil 30 outward in the radial direction of the top foil 30. The fixed end 31 includes the first short edge 30b of the top foil 30. The free end 32 is the other end in the long-side direction of the metal plate forming the top foil 30. The free end 32 includes the second short edge 30b of the top foil 30. In the circumferential direction B, the free end 32 is spaced apart from the proximal end of the fixed end 31 and faces the proximal end of the fixed end 31. Thus, the top foil 30 is an annular body from which a part in the circumferential direction is cut out.

The fixed end 31 includes cutout portions 31a and an insertion plate portion 31b. The cutout portions 31a are formed by cutting out parts of the opposite ends of the fixed end 31 in the axial direction A. One of the cutout portions 31a is formed by cutting out a part of the first long edge 30a and a part of the first short edge 30b. The other cutout portion 31a is formed by cutting out a part of the second long edge 30a and a part of the first short edge 30b. Each cutout portion 31a includes a first cutout edge 311a and a second cutout edge 312a. The first cutout edge 311a extends in the radial direction C. The second cutout edge 312a is continuous with the first cutout edge 311a. The second cutout edge 312a extends in the axial direction A. The first cutout edges 311a of the cutout portions 31a form the opposite ends in the axial direction A of the insertion plate portion 31b. The insertion plate portion 31b includes the first short edge 30b, which includes the cutout portions 31a.

As shown in FIG. 2, the insertion plate portion 31b of the top foil 30 is inserted in one of the holding grooves 20b. The top foil 30 includes the insertion plate portion 31b, which is inserted into the holding groove 20b and extends in the axial direction A.

Bump Foil

The three bump foils 40 are disposed between the bearing housing 20 and the top foil 30. The three bump foils 40 are arranged at specified intervals in the circumferential direction B. The thickness of each bump foil 40 is less than the thickness of the top foil 30.

As shown in FIG. 3, each bump foil 40 is formed by bending a flexible elongated metal plate into a substantially arcuate shape. Each bump foil 40 includes two long edges 40a and two short edges 40b. The short-side direction of each bump foil 40 agrees with the axial direction A of the bearing housing 20. The length between the two long edges 40a is shorter than the length in the axial direction A of the bearing housing 20. The length between the two long edges 40a is shorter than the length between the two long edges 30a of the top foil 30. The metal plate forming each bump foil 40 is made of, for example, stainless steel or an Inconel® type nickel alloy.

Each bump foil 40 includes a fixed end 41 and a free end 42. The fixed end 41 is an end in the long-side direction of the metal plate forming the bump foil 40. The fixed end 41 includes one of the short edges 40b of the bump foil 40. The free end 42 is the other end in the long-side direction of the metal plate forming the bump foil 40. The free end 42 includes the other short edge 40b of the bump foil 40.

As shown in FIG. 2, each bump foil 40 has multiple valleys 43, which contact the inner circumferential surface 20a of the bearing housing 20. The valleys 43 extend along the inner circumferential surface 20a of the bearing housing 20. Each bump foil 40 has multiple peaks 44, which contact the outer circumferential surface of the top foil 30. The peaks 44 project away from the inner circumferential surface 20a of the bearing housing 20. Each peak 44 is arcuately curved to bulge toward the outer circumferential surface of the top foil 30. Each bump foil 40 has a corrugated shape in which the valleys 43 and the peaks 44 are alternately arranged in the circumferential direction B. Each bump foil 40 has a configuration in which the valleys 43 and the peaks 44 are arranged alternately from the fixed end 41 toward the free end 42. The fixed end 41 and the free end 42 are each continuous with the peaks 44.

Figure 4:
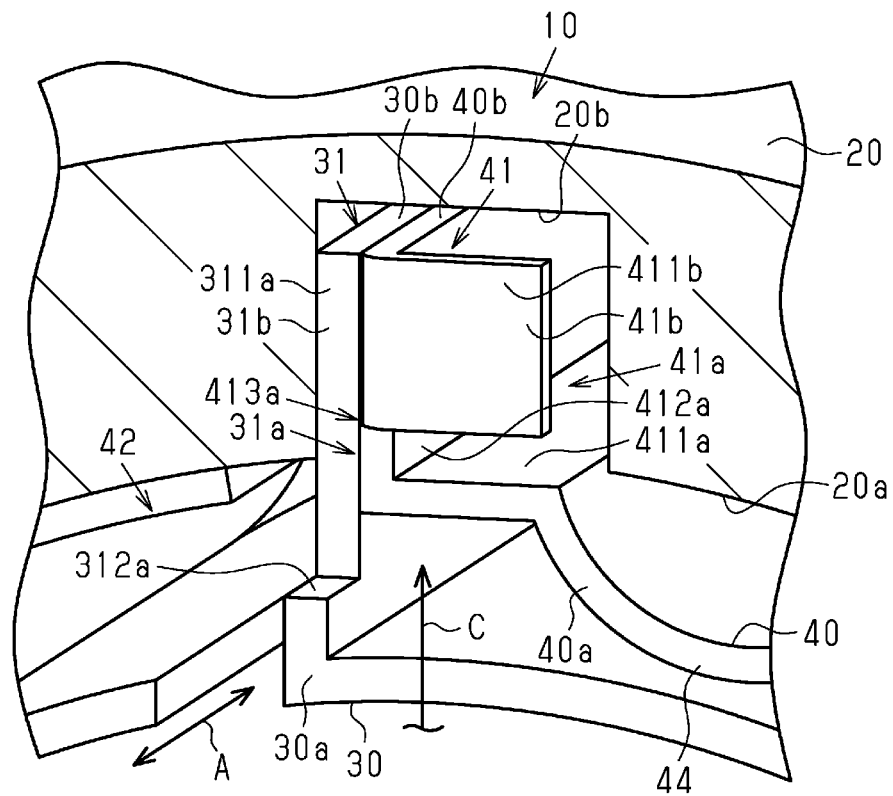
FIG. 4 is a perspective view of a bent plate portion of the foil bearing shown in FIG. 2.

As shown in FIG. 4, the fixed end 41 of each bump foil 40 includes an insertion plate portion 41a. The insertion plate portion 41a extends in the axial direction A. The insertion plate portion 41a includes a first section 411a, a second section 412a, and bent plate portions 41b. The bent plate portions 41b are arranged at the opposite ends in the axial direction A of the insertion plate portion 41a. The portion including the first section 411a and the second section 412a is L-shaped when viewed in the axial direction A. The first section 411a is continuous with one of the peaks 44. The first section 411a has a thickness in the radial direction C. The first section 411a extends in the axial direction A.

The second section 412a extends outward in the radial direction C from the edge of the first section 411a on the side opposite to the peak 44. The second section 412a extends in the axial direction A. The second section 412a includes one of the short edges 40b of the bump foil 40.

As shown in FIGS. 3 and 4, the bent plate portions 41b are provided at the opposite ends in the axial direction A of the second section 412a. The second section 412a includes cutout portions 413a at the opposite ends in the axial direction A. The cutout portions 413a are formed in parts of the second section 412a that are in the vicinity of the first section 411a. The bent plate portions 41b are bent with respect to the second section 412a to extend in the circumferential direction B from the opposite ends in the axial direction A of the second section 412a. The bent plate portions 41b are formed integrally with the second section 412a. The bent plate portions 41b are bent with respect to a section of the insertion plate portion 41a other than the bent plate portions 41b. The bent plate portions 41b extend toward the same side in the circumferential direction B from the opposite ends of the insertion plate portion 41a. The bent plate portions 41b also extend in the radial direction C. The bent plate portions 41b may be fixed to the second section 412a, for example, by welding.

As shown in FIG. 4, each bent plate portion 41b includes an end face 411b extending in the radial direction C. The end face 411b is flush with one of the long edges 40a of the bump foil 40. That is, the length between the two end faces 411b of the bump foil 40 is equal to the length between the two long edges 40a of the bump foil 40. The amount of extension of the end face 411b from the second section 412a in the circumferential direction B is at least greater than the thickness of the bump foil 40. In a direction orthogonal to both the direction in which the end face 411b extends from the second section 412a and the thickness direction of the bent plate portion 41b, the length of the end face 411b is greater than the thickness of the bump foil 40. The bent plate portion 41b has a size such that the bent plate portion 41b can be inserted into the holding groove 20b.

As shown in FIGS. 2 and 4, the insertion plate portion 41a of each bump foil 40 is inserted into the corresponding holding groove 20b. The second section 412a and the bent plate portions 41b of each bump foil 40 are inserted into the corresponding holding groove 20b. The bump foil 40 includes the insertion plate portion 41a, which is inserted into the holding groove 20b and extends in the axial direction A. The insertion plate portion 41a of one of the three bump foils 40 is inserted into one of the holding grooves 20b together with the insertion plate portion 31b of the top foil 30. The insertion plate portions 41a of the remaining two bump foils 40 are respectively inserted into the remaining two holding grooves 20b. As for the bump foils 40 adjacent to each other in the circumferential direction B, the free end 42 of one of the bump foils 40 is spaced apart from the fixed end 41 of the other bump foil 40 by a specified distance. The three bump foils 40 are disposed outward in the radial direction C of the top foil 30. The three bump foils 40 elastically support the top foil 30 between the bearing housing 20 and the top foil 30.

Retaining Member

As shown in FIG. 3, each retaining member 50 has a circular and annular shape. The inner diameter of each retaining member 50 is the same as the outer diameter of the cylindrical surface 20d of the bearing housing 20. In the axial direction A, one of the retaining members 50 is fitted in the cutout groove 20c formed in the first end portion 21 of the bearing housing 20. In the axial direction A, the other retaining member 50 is fitted in the cutout groove 20c formed in the second end portion 22 of the bearing housing 20. Each retaining member 50 contacts the corresponding annular surface 20e. Each retaining member 50 faces the corresponding holding grooves 20b, which open in the annular surface 20e in the axial direction A. The retaining members 50 are fixed to the bearing housing 20 by fixing means (not shown).

Figure 5:
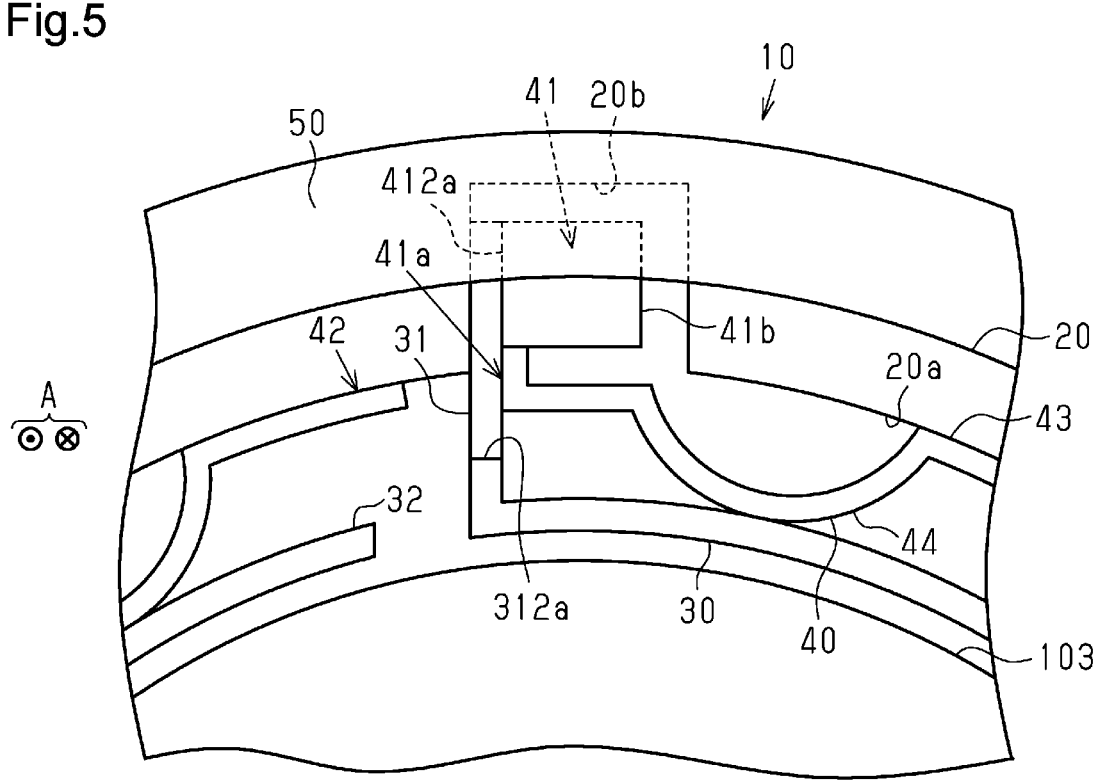
FIG. 5 is a diagram showing a positional relationship between a retaining member and the bent plate portion in the foil bearing shown in FIG. 2.

As shown in FIGS. 3 and 5, each retaining member 50 faces the insertion plate portion 31b of the top foil 30 and the insertion plate portions 41a of the bump foils 40 in the axial direction A. Each retaining member 50 faces part of the bent plate portions 41b in the axial direction A. Each retaining members 50 is a retaining portion that faces the top foil 30 and the bump foils 40 in the axial direction A and prevents the top foil 30 and the bump foils 40 from being dislodged from the bearing housing 20.

Figure 6:
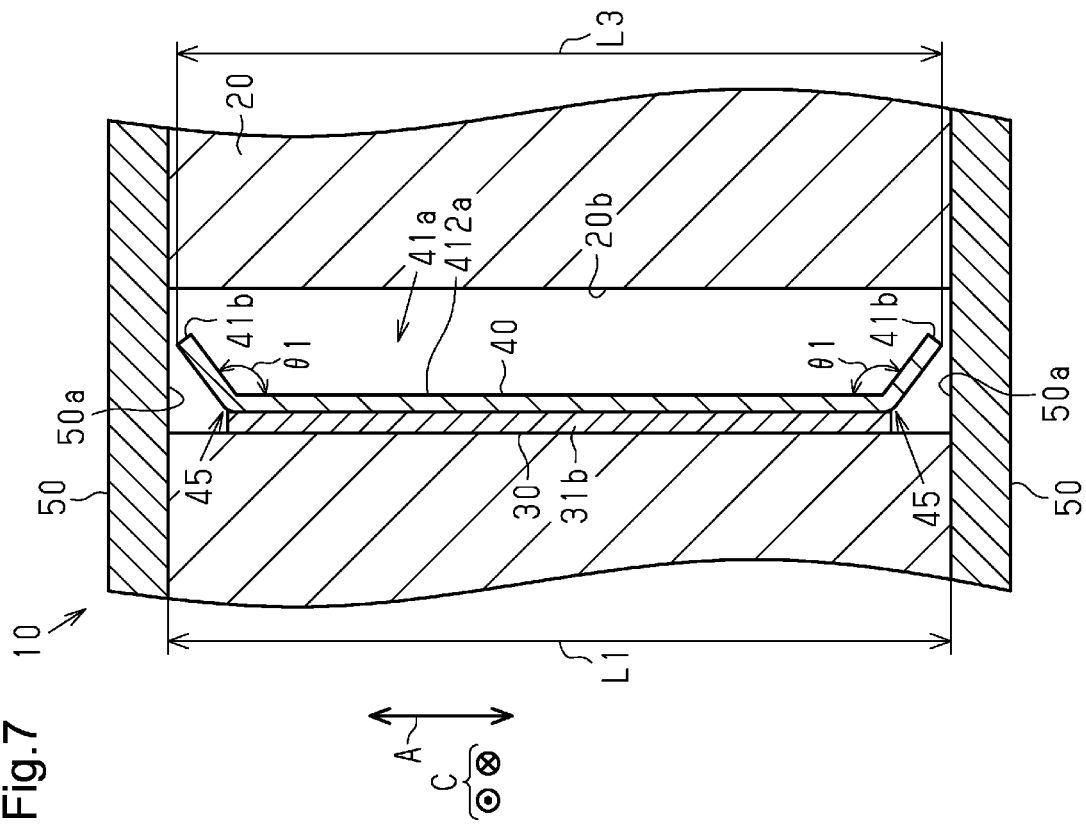
FIG. 6 is a cross-sectional view taken along line 6-6 of FIG. 2.

As shown in FIG. 6, each retaining member 50 includes a facing surface 50a that faces the insertion plate portions 31b, 41a in the axial direction A. The facing surface 50a is a surface extending in the radial direction C. The facing surface 50a extends in a direction orthogonal to the axis of the bearing housing 20. In the axial direction A, a distance L1 between the two facing surface 50a is longer than a length L2 between the end faces 411b of the two bent plate portions 41b. That is, in the axial direction A, the distance L1 between the two facing surfaces 50a is longer than the length L2 of the insertion plate portion 41a. The facing surfaces 50a of the retaining members 50 are parallel to the end faces 411b of the bent plate portions 41b. The bent plate portions 41b thus extend along the facing surfaces 50a.

Operation of First Embodiment

Operation of the first embodiment will now be described.

As shown in FIG. 2, when the rotary shaft 103 rotates in a rotation direction D and the rotation speed of the rotary shaft 103 reaches a specified rotation speed, an air film 105 is formed between the rotary shaft 103 and the top foil 30. This separates the rotary shaft 103 from the top foil 30. The rotary shaft 103 is supported by the air film 105 in a state of being separated from the top foil 30 in the radial direction Rd.

While the rotary shaft 103 is rotating, the rotary shaft 103 may be inclined with respect to the axis of the bearing housing 20. If the rotary shaft 103 is inclined with respect to the axis of the bearing housing 20, the thickness of the air film 105 is uneven in the axial direction A. In the axial direction A, dynamic pressure in the radial direction Rd generated by the air film 105 is low in some areas and high in other areas. Thus, at least one of the top foil 30 or the set of the bump foils 40 receives a moving force acting in the axial direction A. This causes at least one of the top foil 30 and the set of the bump foils 40 to be pressed against the retaining member 50 more than necessary.

Also, in the present embodiment, the thickness of the bump foils 40 is less than the thickness of the top foil 30. If the bump foils 40 do not have the bent plate portions 41b, and the thickness of the bump foils 40 is less than the thickness of the top foil 30, the wear caused by contact between the bump foils 40 and the retaining members 50 may be greater than the wear caused by contact between the top foil 30 and the retaining members 50.

In the present embodiment, the bent plate portions 41b are in planar contact with the facing surfaces 50a. This ensures a sufficient contact area between each bump foil 40 and the retaining members 50. This reduces the contact pressure between the bump foils 40 and the retaining members 50. Thus, even if the bump foils 40 are pressed against the retaining members 50 more than necessary, the wear caused by contact between the bump foils 40 and the retaining member 50 is reduced.

Advantages of First Embodiment

The present embodiment has the following advantages.

(1-1) The bent plate portions 41b are in planar contact with the facing surfaces 50a. This ensures sufficient contact area between the bump foils 40 and the retaining members 50. This reduces the contact pressure between the bump foils 40 and the retaining members 50. Thus, even if the bump foils 40 are pressed against the retaining members 50 more than necessary, the wear of the bump foils 40 and the retaining member 50 is reduced.

(1-2) If the bump foils 40 do not have the bent plate portions 41b, and the thickness of the bump foils 40 is less than the thickness of the top foil 30, the wear caused by contact between the bump foils 40 and the retaining members 50 may be greater than the wear caused by contact between the top foil 30 and the retaining members 50.

In this regard, each bump foil 40 of the present embodiment includes the bent plate portions 41b in the insertion plate portion 41a. This further effectively reduces the wear caused by contact between the bump foils 40 and the retaining members 50.

(1-3) The bent plate portions 41b extend toward the same side in the circumferential direction B from the opposite ends of the insertion plate portion 41a. Thus, as compared with a case in which the bent plate portions 41b extend toward different sides from the insertion plate portion 41a, the width of the holding groove 20b in the circumferential direction B is reduced. Thus, the machining amount of the bearing housing 20 is reduced, which limits reduction in the strength of the foil bearing 10.

Second Embodiment

A foil bearing according to a second embodiment will now be described with reference to FIGS. 7 and 8. The same reference numerals are given to those components that are the same as the corresponding components of the first embodiment and detailed explanations are omitted.

Bent Plate Portion

Figure 7:
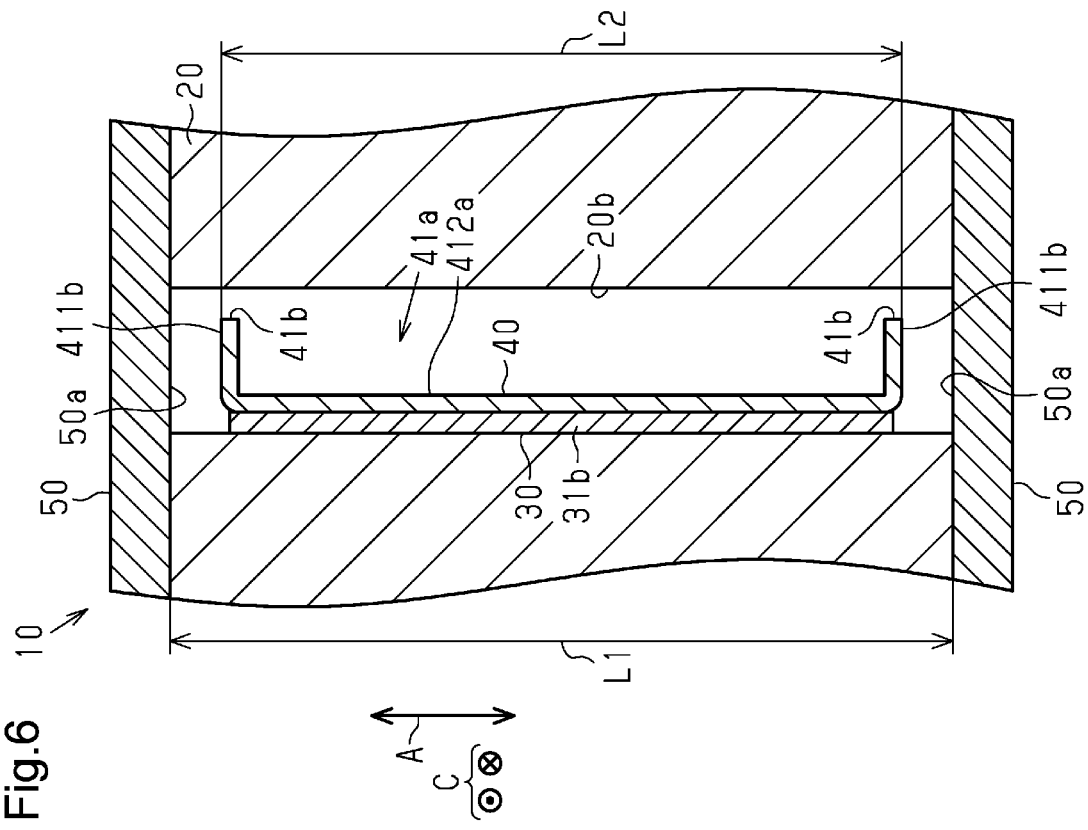
FIG. 7 is a cross-sectional view of a foil bearing according to a second embodiment.

As shown in FIG. 7, an angle θ1 formed between each bent plate portion 41b and the second section 412a is an obtuse angle. Each bent plate portion 41b is connected to the second section 412a to form an obtuse angle with the second section 412a. The second section 412a is a main plate portion that is located in the holding groove 20b and extends in the axial direction A. The insertion plate portion 41a includes the second section 412a, which is a main plate portion located in the holding groove 20b and extending in the axial direction A.

In the axial direction A, the distance L1 between the two facing surface 50a is longer than a length L3 between the tips of the two bent plate portions 41b. That is, in the axial direction A, the distance L1 between the two facing surfaces 50a is longer than the length L3 of the insertion plate portion 41a.

A bent portion 45 is formed at the boundary between the second section 412a and each bent plate portion 41b. The bent portion 45 has a spring structure. The angle θ1 shown in FIG. 7 is an angle before the bump foil 40 and the retaining members 50 contact each other.

Figure 8:
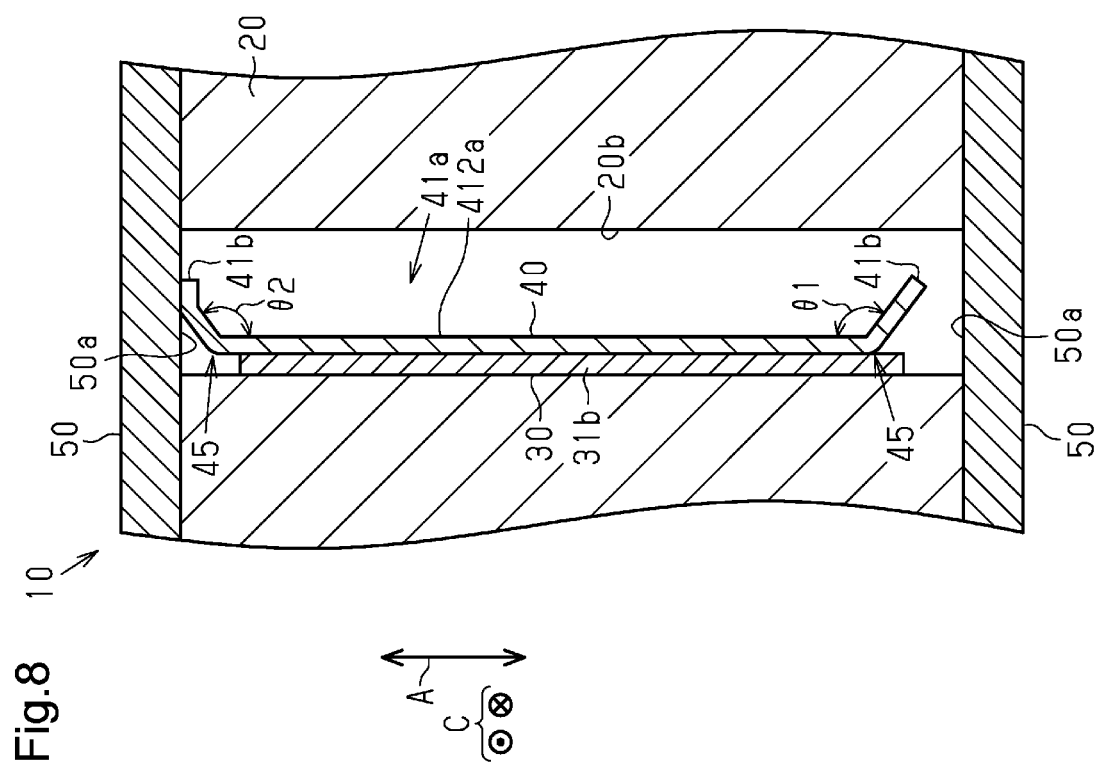
FIG. 8 is a cross-sectional view showing operation of the foil bearing shown in FIG. 7.

As shown in FIG. 8, in the present embodiment, when the bent plate portion 41b is pressed against the retaining member 50, the angle θ2 formed between the bent plate portion 41b and the second section 412a is smaller than the angle θ1. When the bump foil 40 is continuously pressed against the retaining member 50, the bent plate portion 41b continues to bend such that the area of the bent plate portion 41b that contacts the facing surface 50a of the retaining member 50 increases.

FIG. 8 shows a state in which part of the bent plate portion 41b is in planar contact with the facing surface 50a of the retaining member 50. In this state, if the bump foil 40 is continuously pressed against the retaining member 50, the bent plate portion 41b will eventually be deformed to extend along the facing surface 50a of the retaining member 50, so that the angle θ2 becomes 90 degrees. In the present embodiment, the material of the bump foils 40, the thickness of the bump foils 40, the rigidity of the bent plate portions 41b, and the angle θ1 are adjusted such that the area of the bent plate portion 41b that contacts the facing surface 50a of the retaining member 50 increases as the bump foil 40 is pressed against the facing surface 50a of the retaining member 50. Even if the bump foil 40 is continuously pressed against the retaining member 50, the bent plate portion 41b does not necessarily need to be bent to a state of extending along the facing surface 50a.

Operation of Second Embodiment

Operation of the present embodiment will now be described.

In the present embodiment, the bent portion 45 between the bent plate portion 41b and the second section 412a has a spring structure. Thus, even if the bump foil 40 is pressed against the retaining member 50 more than necessary, the load applied to the bump foil 40 and the retaining member 50 is absorbed by the elasticity of the bent portion 45. This reduces the contact pressure between the bump foil 40 and the retaining member 50 and thus reduces the wear caused by the contact between the bump foil 40 and the retaining member 50.

Advantages of Second Embodiment

The present embodiment has the following advantages.

(2-1) The bent portion 45 between the bent plate portion 41b and the second section 412a has a spring structure. Thus, even if the bump foil 40 is pressed against the retaining member 50 more than necessary, the load applied to the bump foil 40 and the retaining member 50 is absorbed by the elasticity of the bent portion 45. This reduces the contact pressure between the bump foil 40 and the retaining member 50 and thus reduces the wear caused by the contact between the bump foil 40 and the retaining member 50.

(2-2) When the bump foil 40 is continuously pressed against the retaining members 50, the bent plate portion 41b continues to bend such that the area of the bent plate portion 41b that contacts the facing surface 50a of the retaining member 50 increases. This ensures sufficient contact area between the bump foil 40 and the retaining member 50. Thus, the contact pressure between the bump foil 40 and the retaining member 50 is reduced as the contact area between the bent plate portion 41b and the facing surface 50a increases. This further reduces the wear caused by the contact between the bump foil 40 and the retaining member 50.

Third Embodiment

A foil bearing according to a third embodiment will now be described with reference to FIG. 9. The same reference numerals are given to those components that are the same as the corresponding components of the first embodiment and detailed explanations are omitted.

Buffer Portion

Figure 9:
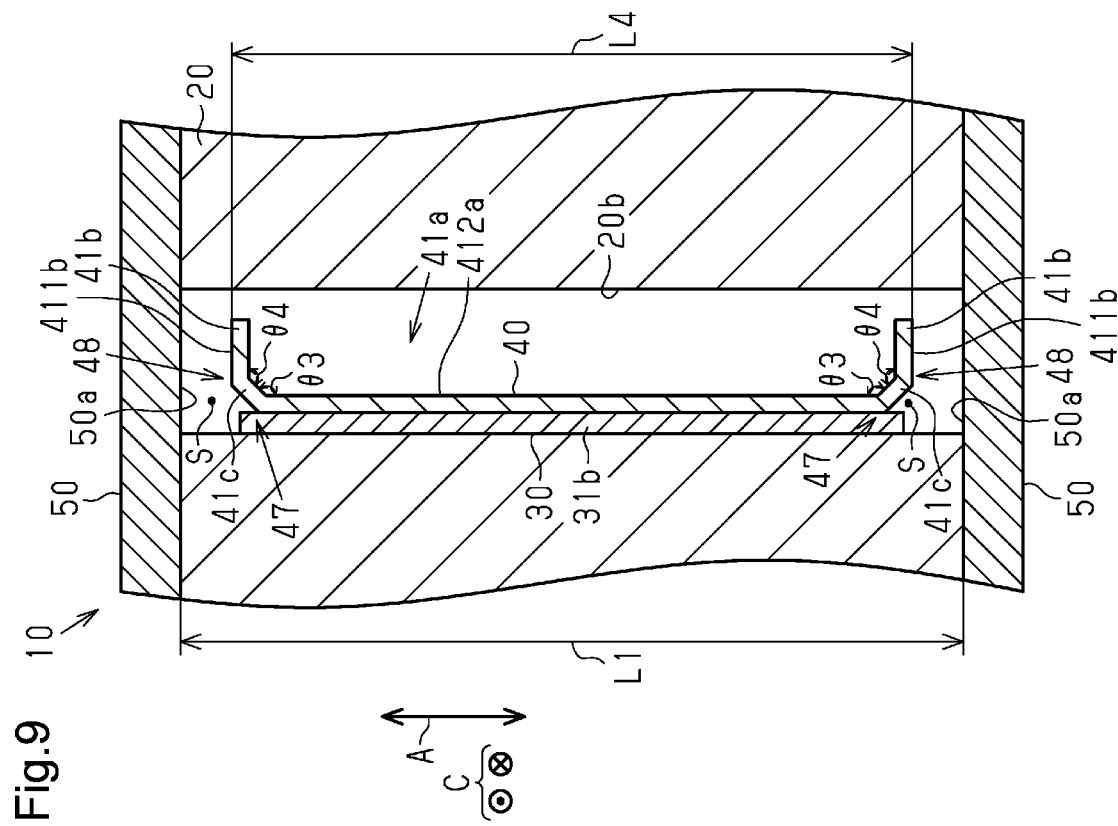
FIG. 9 is a cross-sectional view of a foil bearing according to a third embodiment.

As shown in FIG. 9, the insertion plate portion 41a of each bump foil 40 includes buffer portions 41c. Each buffer portion 41c is a plate-shaped portion that is connected to the second section 412a and the bent plate portion 41b. The second section 412a is a main plate portion that is located in the holding groove 20b and extends in the axial direction A. The insertion plate portion 41a includes the bent plate portions 41b, the second section 412a, and the buffer portions 41c. An angle θ3 formed between the buffer portion 41c and the second section 412a is an obtuse angle. An angle θ4 formed between the bent plate portion 41b and the buffer portion 41c is an obtuse angle. The angles θ3, θ4 shown in FIG. 9 are angles before the bump foil 40 and the retaining members 50 contact each other. A bent portion 47 is formed at the boundary between the second section 412a and the buffer portion 41c. The bent portion 47 has a spring structure. A bent portion 48 is formed at the boundary between the bent plate portion 41b and the buffer portion 41c. The bent portion 48 has a spring structure. In the same manner as the first embodiment, the bent plate portion 41b extends along the facing surface 50a.

In the axial direction A, the distance L1 between the two facing surfaces 50a is longer than a length L4 between the end faces 411b of the two bent plate portions 41b. That is, in the axial direction A, the distance L1 between the two facing surfaces 50a is longer than the length L4 of the insertion plate portion 41a. The buffer portion 41c is separated from the facing surface 50a. Therefore, a specified space S is formed between the buffer portion 41c and the facing surface 50a.

Operation of Third Embodiment

Operation of the present embodiment will now be described.

When the bump foil 40 is pressed against the retaining member 50 more than necessary, the end face 411b of the bent plate portion 41b comes into contact with the facing surface 50a. When the bent plate portion 41b is further pressed against the facing surface 50a, the angles θ3, θ4 are increased. The buffer portion 41c is provided between the second section 412a and the bent plate portion 41b such that the angles θ3, θ4 are changed due to contact between the facing surface 50a and the bent plate portion 41b.

Even if the bump foil 40 is pressed against the retaining member 50 more than necessary, the planar contact between the bent plate portion 41b and the facing surface 50a reduces the contact pressure between the bump foil 40 and the retaining member 50.

Also, the bent portion 47 between the second section 412a and the buffer portion 41c and the bent portion 48 between the buffer portion 41c and the bent plate portion 41b each have a spring structure. Thus, even if the bump foil 40 is pressed against the retaining member 50 more than necessary, the load applied to the bump foil 40 and the retaining member 50 is absorbed by the elasticity of the two bent portions 47, 48. Thus, in addition to the planar contact between the bent plate portion 41b and the facing surface 50a, elastic deformation of the two bent portions 47, 48 further reduces the wear caused by contact between the bump foil 40 and the retaining member 50.

Advantage of Third Embodiment

The present embodiment has the following advantages.

(3-1) Even if the bump foil 40 is pressed against the retaining member 50 more than necessary, the planar contact between the bent plate portion 41b and the facing surface 50a reduces the contact pressure between the bump foil 40 and the retaining member 50.

Also, the bent portion 47 between the second section 412a and the buffer portion 41c and the bent portion 48 between the buffer portion 41c and the bent plate portion 41b each have a spring structure. Thus, even if the bump foil 40 is pressed against the retaining member 50 more than necessary, the load applied to the bump foil 40 and the retaining member 50 is absorbed by the elasticity of the two bent portions 47, 48. Thus, in addition to the planar contact between the bent plate portion 41b and the facing surface 50a, elastic deformation of the two bent portions 47, 48 further reduces the wear caused by contact between the bump foil 40 and the retaining member 50.

Modifications

The above-described embodiments may be modified as follows. The above-described embodiments and the following modifications can be combined as long as the combined modifications remain technically consistent with each other.

The bent plate portions 41b may extend toward the opposite sides in the circumferential direction B from the opposite ends of the insertion plate portion 41a.

Figure 10:
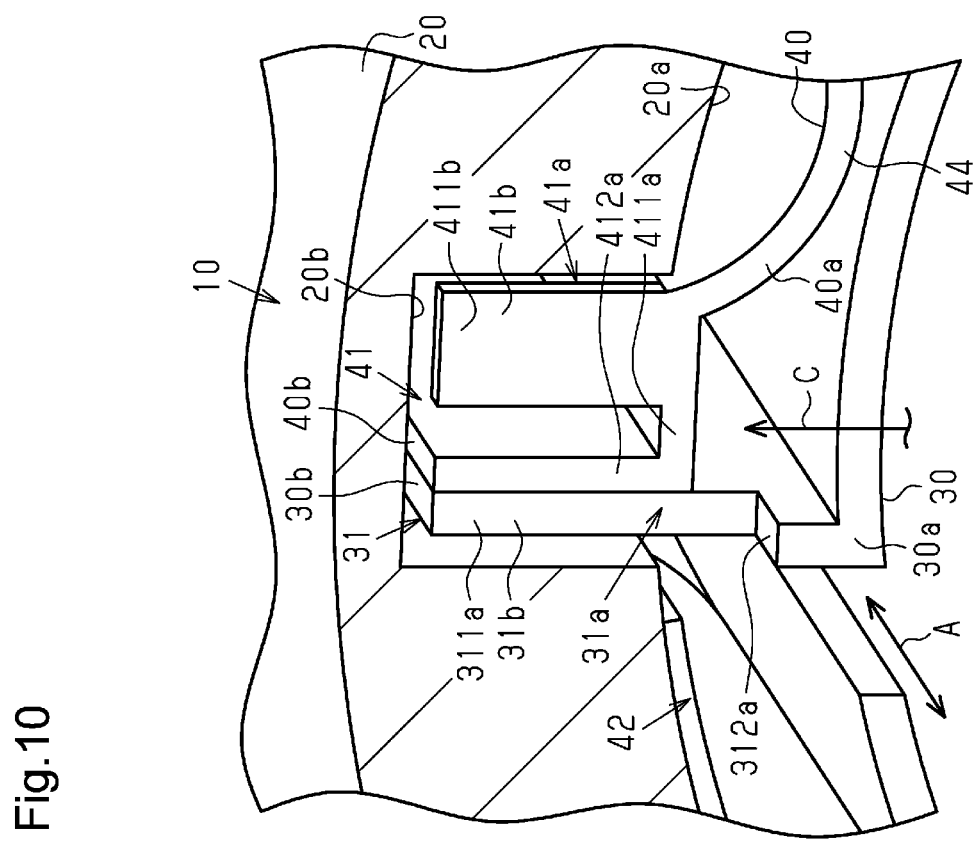
FIG. 10 is a perspective view of a bent plate portion in a foil bearing according to a modification.

As shown in FIG. 10, the bent plate portion 41b may be formed integrally with the first section 411a of the insertion plate portion 41a. The bent plate portion 41b are bent with respect to the first section 411a to extend in the radial direction C from the first section 411a. The amount of extension of the end face 411b from the first section 411a in the radial direction C is made at least greater than the thickness of the bump foil 40. In a direction orthogonal to both the direction in which the end face 411b extends from the first section 411a and the thickness direction of the bent plate portion 41b, the length of the end face 411b is made greater than the thickness of the bump foil 40. The bent plate portions 41b may be fixed to the first section 411a, for example, by welding.

Figure 11:
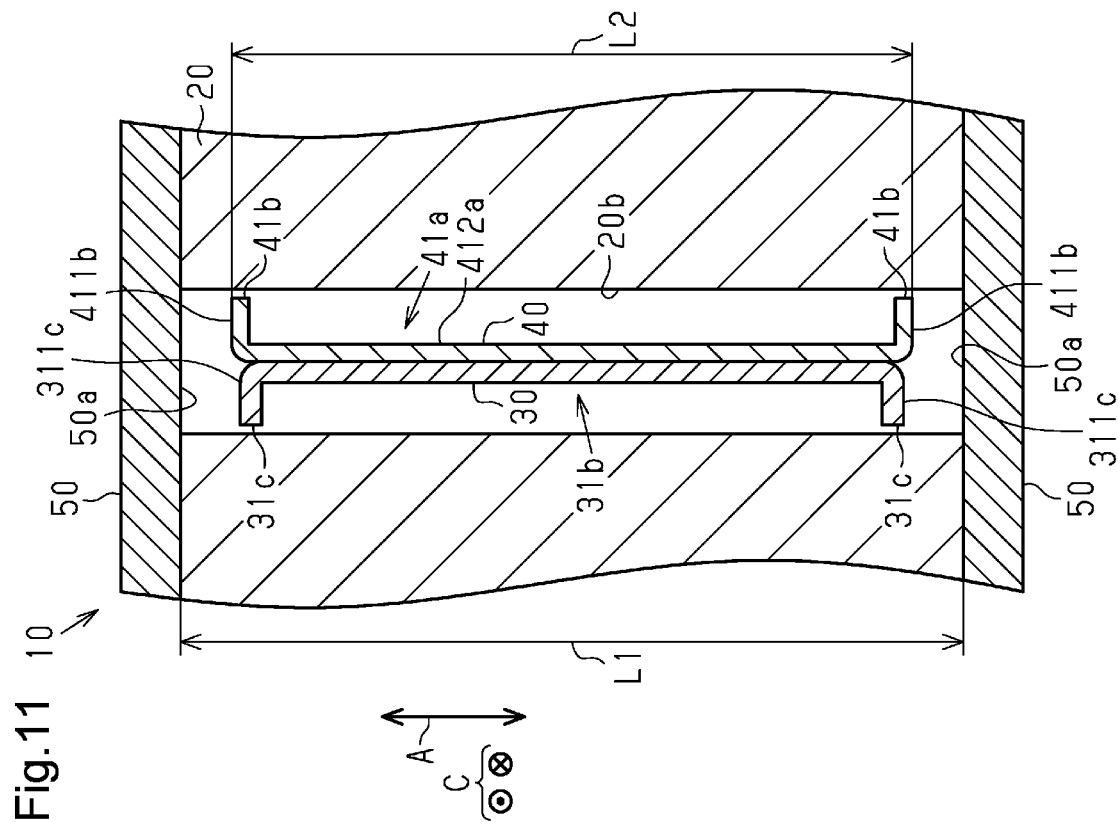
FIG. 11 is a cross-sectional view of a foil bearing according to a modification.

As shown in FIG. 11, the insertion plate portion 31b of the top foil 30 may include bent plate portions 31c, which extend along the facing surfaces 50a of the retaining members 50. The insertion plate portion 31b may include bent plate portions 31c. In this modification, the bent plate portions 31c are provided at the opposite ends in the axial direction A of the insertion plate portion 31b. Each bent plate portion 31c includes an end face 311c. The end face 311c extends in parallel with the facing surface 50a of the retaining member 50. In this modification, the bent plate portions 31c, 41b do not necessarily need to overlap with each other in the axial direction A.

In the axial direction A, the length between the end faces 311c of the two bent plate portions 31c may be equal to the length L2. That is, in the axial direction A, the distance L1 between the two facing surfaces 50a is longer than the length L2 of the insertion plate portion 31b. The length of the insertion plate portion 31b may be different from the length L2. If the distance L1 is longer than the length of the insertion plate portion 31b, the length of the insertion plate portion 31b may be changed.

In the above-described modification shown in FIG. 11, when the insertion plate portion 31b includes the bent plate portions 31c, a portion of the insertion plate portion 31b that is located in the holding groove 20b and extends in the axial direction A serves as the main plate portion of the insertion plate portion 31b. Each bent plate portion 31c may be connected to the main plate portion to form an obtuse angle with the main plate portion of the insertion plate portion 31b.

In the above-described modification shown in FIG. 11, the insertion plate portion 31b may have the same configuration as the buffer portion 41c described in the third embodiment.

The bent plate portions 41b of the bump foil 40 may be omitted, and the top foil 30 may have the bent plate portions 31c. That is, it suffices if at least one of the insertion plate portion 31b of the top foil 30 or the insertion plate portion 41a of the bump foil 40 includes the bent plate portions 31c, 41b. If at least one of the bent plate portions 31c, 41b is provided, the wear caused by contact between the retaining member 50 and at least one of the top foil 30 and the bump foil 40 is reduced.

The thickness of the bump foil 40 may be the same as the thickness of the top foil 30. The thickness of the top foil 30 may be smaller than that of the bump foil 40.

The fixed end 31 of the top foil 30 does not necessarily need to have the cutout portion 31a.

When the two retaining members 50 are fixed to the bearing housing 20, the bent plate portions 41b may already be in contact with the facing surfaces 50a of the retaining members 50.

The positions of the cutout grooves 20c may be changed in the radial direction C if the retaining members 50 can be attached to the cutout grooves 20c.

The two retaining members 50 may be modified as follows. In the following description, the cutout grooves 20c are omitted from the bearing housing 20.

Figure 12:
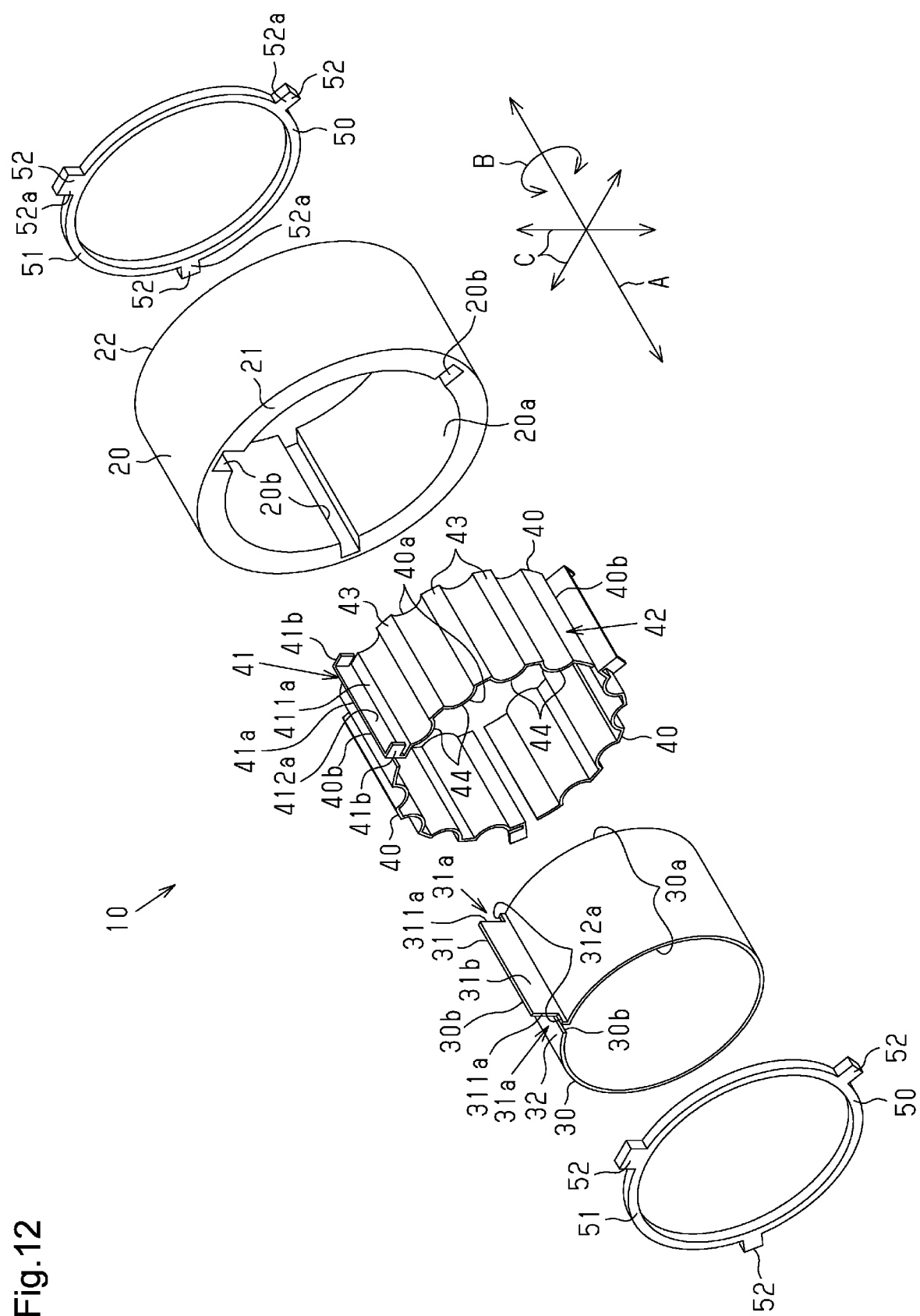
FIG. 12 is an exploded perspective view of a foil bearing according to a modification.

As shown in FIG. 12, each retaining member 50 includes a main body 51 and three fixing portions 52. The main body 51 is circular and annular. The outer diameter of the main body 51 is slightly smaller than the inner diameter of the bearing housing 20. The inner diameter of the main body 51 is larger than the outer diameter of the top foil 30.

Each fixing portion 52 projects outward in the radial direction of the main body 51 from the outer circumferential surface of the main body 51. The fixing portions 52 are arranged on the main body 51 at specified intervals in the circumferential direction of the main body 51. The fixing portions 52 are arranged on the main body 51 to correspond to the holding grooves 20b of the bearing housing 20.

The two retaining members 50 are arranged inside the bearing housing 20. Each fixing portion 52 is arranged in the corresponding holding groove 20b. Each fixing portion 52 is press-fitted into the corresponding holding groove 20b. The retaining member 50 is thus fixed to the bearing housing 20. The outer circumferential surface of the main body 51 extends along the inner circumferential surface 20a of the bearing housing 20. The main body 51 faces part of the fixed end 31 of the top foil 30 and part of the fixed end 41 of the bump foil 40 in the axial direction A. The main body 51 faces the valleys 43 of the bump foil 40 in the axial direction A and faces part of each peak 44. That is, the two retaining members 50 face the top foil 30 and the bump foils 40 in the axial direction A.

The fixing portions 52 of one of the retaining members 50 are press-fitted into the holding grooves 20b from the first end portion 21 of the bearing housing 20. The fixing portions 52 of the other retaining member 50 are press-fitted into the holding grooves 20b from the second end portion 22 of the bearing housing 20. The fixing portions 52 of the two retaining members 50 sandwich the insertion plate portions 41a of the bump foils 40 in the axial direction A. In one of the holding grooves 20b, the fixing portions 52 of the two retaining members 50 also sandwich the insertion plate portion 31b of the top foil 30 in the axial direction A. In this manner, the two retaining members 50 prevent the top foil 30 and the bump foils 40 from being dislodged from the bearing housing 20. The fixing portions 52 preferably include facing surfaces 52a that face the insertion plate portions 31b, 41a in the axial direction A. The facing surfaces 52a extend in the radial direction C.

As shown in FIG. 13, for example, the insertion plate portion 41a may include a bent plate portion 41b only at one end in the axial direction A. Thus, the insertion plate portion 41a only needs to include the bent plate portion 41b at at least one of the opposite ends in the axial direction A. The retaining member 50 facing the other end of the insertion plate portion 41a may include a retaining main body 55 and an elastic portion 56. The retaining main body 55 is, for example, circular and annular. The elastic portion 56 is located at a portion of the retaining main body 55 that faces the insertion plate portion 41a in the axial direction A. The elastic portion 56 is thus provided on the retaining main body 55. The elastic portion 56 is, for example, a rubber member. The elastic portion 56 is elastically deformable. The elastic portion 56 may be, for example, a plastic coating layer formed by coating with plastic a portion of the retaining main body 55 that faces the insertion plate portion 41a in the axial direction A. That is, the elastic portion 56 may have any configuration if it is provided on the retaining main body 55 and is elastically deformable. The surface of the elastic portion 56 opposite to the retaining main body 55 is a facing surface 50a, which faces the insertion plate portion 41a. The elastic portion 56 thus includes the facing surface 50a.

In the above-described configuration, the elastic portion 56 includes the facing surface 50a. Thus, for example, even if the end of the insertion plate portion 41a that does not include the bent plate portion 41b is pressed against the retaining member 50 more than necessary, the contact pressure between the bump foil 40 and the retaining member 50 is reduced by the elastic portion 56. Thus, even if the bent plate portion 41b is not provided at one of the opposite ends in the axial direction A of the insertion plate portion 41a, the wear of the bump foil 40 and the retaining member 50 is reduced.

As shown in FIG. 14, for example, the insertion plate portion 41a may include a bent plate portion 41b only at one of the opposite ends in the axial direction A. Thus, the insertion plate portion 41a only needs to include the bent plate portion 41b at at least one of the opposite ends in the axial direction A. One of the two retaining members 50 that faces the bent plate portion 41b in the axial direction A may be made of a nonmagnetic material. The nonmagnetic material is, for example, stainless steel or aluminum. Further, the retaining member 50 that faces the end of the insertion plate portion 41a that does not include the bent plate portion 41b may be made of a magnetic material. The magnetic material is, for example, stainless steel or iron.

The retaining member 50 made of a magnetic material has a higher wear resistance than the retaining member 50 made of a nonmagnetic material. Thus, for example, even if the end of the insertion plate portion 41a that does not include the bent plate portion 41b is pressed against the retaining member 50 more than necessary, the wear of the retaining member 50 is reduced. Therefore, even if the bent plate portion 41b is not provided at one of the opposite ends in the axial direction of the insertion plate portion 41a, the wear of the retaining member 50 is reduced.

Taking wear resistance into consideration, it is preferable that the retaining member 50 be made of a magnetic material. If the retaining member 50 is made of a magnetic material, the coils of the electric motor 102 may generate heat due to the influence of the magnetic flux generated by the retaining member 50. Thus, one of the two retaining members 50 that is closer to the electric motor 102 may be made of a nonmagnetic material. However, the wear resistance of the retaining member 50 made of a nonmagnetic material is lower than that of the retaining member 50 made of a magnetic material. Thus, the retaining member 50 made of a nonmagnetic material faces the bent plate portions 41b in the axial direction A. Thus, even if the retaining member 50 close to the electric motor 102 is made of a nonmagnetic material, the contact pressure between the bump foils 40 and the retaining member 50 is reduced by planar contact between the bent plate portions 41b and the facing surface 50a. This reduces the wear caused by the contact between the bump foil 40 and the retaining member 50.

In the modification shown in FIG. 12, the main bodies 51 may be omitted, and only the fixing portions 52, which are press-fitted into the holding grooves 20b, may be used as retaining portions.

The cutout grooves 20c of the bearing housing 20 may be omitted, and the two retaining members 50 may be fixed to the opposite end faces in the axial direction A of the bearing housing 20. The retaining members 50 may cover the holding grooves 20b in the axial direction A and include facing surfaces that face the insertion plate portions 31b, 41a. In this modification, the retaining members 50 may be fixed to the bearing housing 20 by, for example, bolts or adhesive. In short, the retaining members 50 may be fixed to the bearing housing 20 by any means. The retaining members 50 may be snap rings.

One of the two retaining members 50 may be omitted. In this case, the portions of the holding grooves 20b that open in the first end portion 21 or the second end portion 22 of the bearing housing 20 are preferably closed. The opening of the holding grooves 20b may be closed by a part of the bearing housing 20. In this case, the portion of the bearing housing 20 that closes the opening of the holding grooves 20b may be a retaining portion. In other words, the bearing housing 20 may include a retaining portion. The retaining portion of the bearing housing 20 includes a facing surface that faces the insertion plate portions 31b, 41a in the axial direction A.

The facing surfaces 50a do not necessarily need to extend in a direction orthogonal to the axis of the bearing housing 20. The facing surfaces 50a may be inclined with respect to the axis of the bearing housing 20 if the facing surfaces 50a extend in the radial direction C.

In the illustrated embodiment, three bump foils 40 are employed. However, a single substantially annular bump foil 40 may be employed. In this case, the bearing housing 20 may include only one holding groove 20b.

The foil bearing 10 does not necessarily need to support the rotary shaft 103 of the centrifugal compressor 100 in the radial direction Rd. The apparatus in which the foil bearing 10 is employed may be changed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A foil bearing that supports a rotary shaft in a radial direction, the foil bearing comprising:
   a tubular bearing housing into which the rotary shaft is inserted;
   a top foil disposed between the rotary shaft and the bearing housing;
   a bump foil that is disposed between the bearing housing and the top foil to elastically support the top foil; and
   two retaining portions facing the top foil and the bump foil in an axial direction of the bearing housing and preventing the top foil and the bump foil from being dislodged from the bearing housing, wherein
   a holding groove is formed in an inner circumferential surface of the bearing housing to extend in the axial direction,
   the top foil and the bump foil each include an insertion plate portion, which is inserted into the holding groove and extends in the axial direction,
   each of the retaining portions includes a facing surface that faces the insertion plate portions in the axial direction,
   in the axial direction, a distance between the facing surfaces of the two retaining portions is longer than a length of the insertion plate portions, and
   at least one of the insertion plate portion of the top foil and the insertion plate portion of the bump foil includes a bent plate portion at at least one of opposite ends in the axial direction, the bent plate portion being bent and contacting the corresponding facing surface during a rotation of the rotary shaft in a state in which the rotary shaft is inclined with respect to an axis of the bearing housing.

2. The foil bearing according to claim 1, wherein the bent plate portion extends along the corresponding facing surface.

3. The foil bearing according to claim 2, wherein
   the at least one of the insertion plate portion of the top foil and the insertion plate portion of the bump foil includes:
      the bent plate portion;
      a main plate portion that is located in the holding groove and extends in the axial direction; and
      a buffer portion that is a plate-shaped portion connected to the main plate portion and the bent plate portion, and
   the buffer portion is provided between the main plate portion and the bent plate portion such that contact between the facing surface and the bent plate portion changes an angle formed between the buffer portion and the main plate portion and an angle formed between the buffer portion and the bent plate portion.

4. The foil bearing according to claim 3, wherein a space is formed between the buffer portion and the facing surface.

5. The foil bearing according to claim 1, wherein
   each facing surface extends in a direction orthogonal to an axis of the bearing housing,
   each insertion plate portion includes a main plate portion that is located in the holding groove and extends in the axial direction, and
   the bent plate portion is connected to the corresponding main plate portion such that the bent plate portion and the corresponding main plate portion form an obtuse angle.

6. The foil bearing according to claim 1, wherein
   a thickness of the bump foil is less than a thickness of the top foil, and
   the bent plate portion is provided on the insertion plate portion of the bump foil.

7. The foil bearing according to claim 1, wherein
   each of the opposite ends of the at least one of the insertion plate portion of the top foil and the insertion plate portion of the bump foil is provided with the bent plate portion, and
   the bent plate portions extend toward the same side in a circumferential direction of the bearing housing from the at least one of the insertion plate portion of the top foil and the insertion plate portion of the bump foil.

8. The foil bearing according to claim 1, wherein
   only one of the opposite ends of the at least one of the insertion plate portion of the top foil and the insertion plate portion of the bump foil is provided with the bent plate portion,
   the retaining portion that faces the other opposite end of the at least one of the insertion plate portion of the top foil and the insertion plate portion of the bump foil includes a retaining main body and an elastic portion that is provided on the retaining main body and is elastically deformable, and
   the elastic portion forms the facing surface.

9. The foil bearing according to claim 1, wherein
   only one of the opposite ends of the at least one of the insertion plate portion of the top foil and the insertion plate portion of the bump foil is provided with the bent plate portion,
   the retaining portion that faces the bent plate portion is made of a nonmagnetic material, and
   the retaining portion that faces the other opposite end of the at least one of the insertion plate portion of the top foil and the insertion plate portion of the bump foil is made of a magnetic material.

* * * * *